Feb. 7, 1933.   H. WEICHSEL   1,896,264
DYNAMO ELECTRIC MACHINE
Filed Feb. 23, 1929
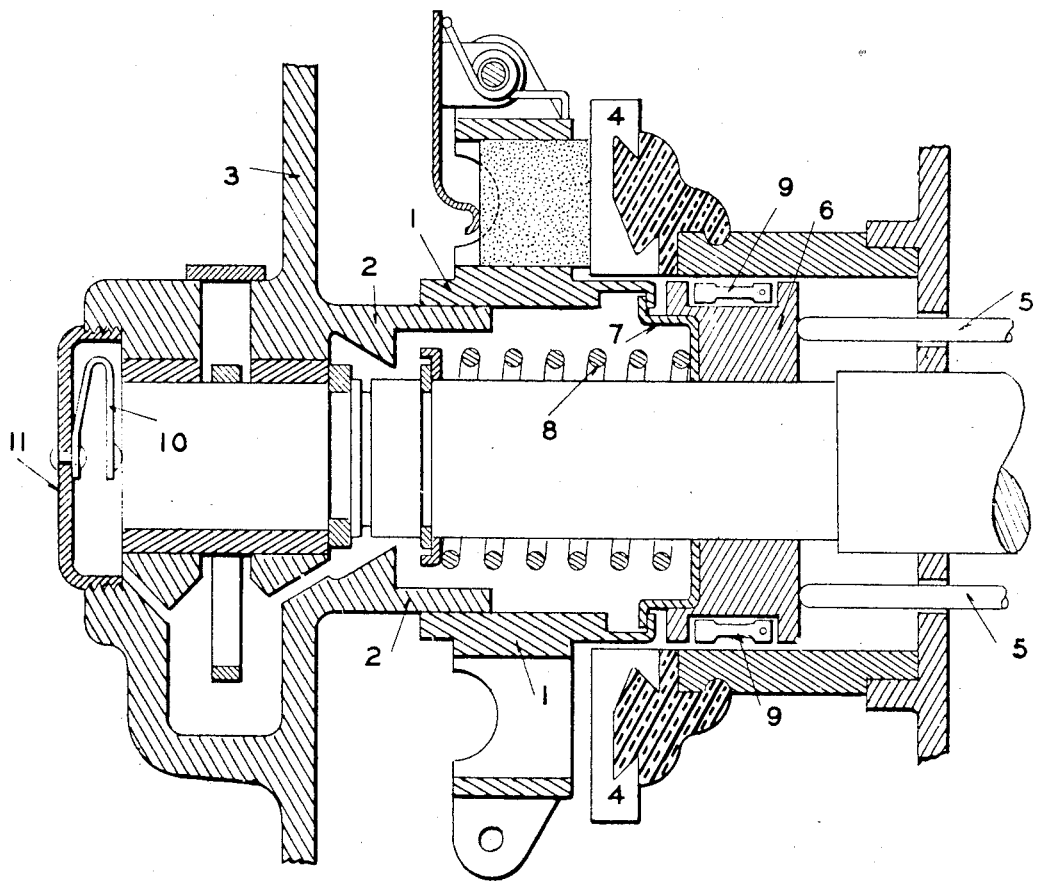
Inventor
HANS WEICHSEL
By E. E. Huffman
Att'y Patented Feb. 7, 1933

1,896,264

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

DYNAMO ELECTRIC MACHINE

Application filed February 23, 1929. Serial No. 342,070.

In repulsion-induction motors as usually constructed the operation of the brush shifting and commutator short-circuiting mechanism may be such, during the transitional period, as to momentarily place one or more short-circuiting armature coils in circuit with the shaft and frame of the machine, whereby currents pass through the contact faces of a shaft bearing and produce deterioration of the bearing face as the result of sparking. Also, in some alternating current machines voltages induced in the shaft may be the source of objectionable currents through the bearing. The object of my invention is to prevent, in a very simple and convenient way, the circulation of injurious currents through the shaft contacting faces of the bearing.

The accompanying drawing illustrates one manner of application of my invention to a motor, the particular form of motor indicated being of the repulsion-induction type, the brush shifting and commutator short-circuiting mechanism of which is shown.

The brush shifting and short-circuiting mechanism illustrated being of a common type, it will be only briefly described to explain how, in its operation, the motor shaft may become a part of a circuit including an armature coil as the source of voltage producing current through it. The brush holder 1 is slidably mounted on the hub 2 formed on the end plate 3 of the machine and is actuated to move the brushes into and out of contact with the commutator 4, by means of centrifugal elements (not shown) which, to move the brush holder to inoperative position, actuate rods 5 which bear against the sleeve 6 on the shaft which in turn bears upon the cup 7 having a flange projecting to engage the brush holder. The motion of the part described under the influence of centrifugal elements is opposed by the spring 8 which, when the centrifugal elements are in retracted position during standstill or low speeds of the machine, moves the cup 7 to bring the brush holder back to position in which the brushes are in operative relation with the commutator. The collar 6 is provided with a circumferential groove in which lie a plurality of commutator short-circuiting elements 9. These elements move outward under the influence of centrifugal force and engage the commutator segments to short-circuit them. A lost motion connection between the cup 7 and the brush holder is provided, as shown, in order that the short-circuiting segments may be moved into opposition with the commutator segments and short-circuit them before the brushes are moved out of contact with the commutator. It frequently happens, however, that one or more of the short-circuiting segments will momentarily, during the transitional period between the standstill position of the motor and the separation of the brushes from the commutator and the complete short-circuiting of the commutator, be in contact with the commutator and directly, or through other elements, in contact with the metal collar 6 which slides on the motor shaft and that at this time an armature coil with which it is in circuit through a commutator segment is not short-circuited. The voltage in an uncircuited coil may therefore establish a current through a circuit comprising the armature shaft, its bearing, the frame of the machine, and the brush holder and the brush.

In order to bypass this current around the bearing I have conceived the idea of attaching a spring contact element 10 to the inner surface of the usual dust cap 11 which is employed to enclose the end of the bearing and shaft and have the contact portion of this element bear upon the center of the end of the shaft. Since the dust cap is of conductive material and, by threaded engagement with the bearing-housing, is in electrical connection with the bearing, the arrangement described forms an electrical connection between the shaft and bearing other than the contact faces of the bearing with the shaft and one of much lower resistance, whereby substantially none of any current through the shaft and end plate will pass through the bearing faces. By having the contact member bear on the center of the shaft where the peripheral speed is the lowest, I avoid any substantial wear on the contact element.

The construction described has the further advantage that the condition of the contact element, contact faces, and the resiliency of the support can be readily examined and any defect removed. If the spring should be broken or lose its temper the bypassing circuit can be restored by the simple and inexpensive expedient of substituting another cap with its attached spring contact.

Having fully described my invention, what I claim as new and desire to secure as Letters Patent of the United States is:

1. Means for establishing electrical connection between a shaft and its bearing other than through their contact faces, which comprises a cap on the bearing-housing and enclosing the end of the shaft, and a contact element resiliently mounted on the cap and engaging the shaft.

2. Means for establishing electrical connection between the shaft and its bearing other than through their contact faces, which comprises a cap of conductive material enclosing the end of the shaft and in electrical connection with the bearing, said cap being provided with a spring contact member adapted to bear on the central part of the end of the shaft and electrically connect the shaft with the cap.

In testimony whereof, I hereunto affix my signature, this 23d day of January, 1929.

HANS WEICHSEL.